Sept. 27, 1949.  E. C. PYATT ET AL  2,482,932
ELECTRICAL TESTING AND INDICATING SYSTEM
Filed July 29, 1947  5 Sheets-Sheet 1

Sept. 27, 1949.  E. C. PYATT ET AL  2,482,932
ELECTRICAL TESTING AND INDICATING SYSTEM
Filed July 29, 1947  5 Sheets-Sheet 4

FIG. 36.

Patented Sept. 27, 1949

2,482,932

UNITED STATES PATENT OFFICE 2,482,932

ELECTRICAL TESTING AND INDICATING SYSTEM

Edward Charles Pyatt and Kenneth Cedric Arthur King, London, England, assignors to Telephone Manufacturing Company Limited, London, England, a British company Application July 29, 1947, Serial No. 764,528
In Great Britain July 24, 1946

Section 1, Public Law 690, August 8, 1946
Patent expires July 24, 1966

8 Claims. (Cl. 178—69)

This invention relates to electrical testing and indicating systems. The invention is more particularly concerned with systems for testing or indicating the operation of telegraph apparatus.

In certain types of telegraph systems, use is made of signals comprising mark and space elements of which the duration is a multiple of a fixed unit. In practice, however, the received signals are distorted and depart from the exact spacing, and for various purposes, such as the marginal testing of teleghaph apparatus, it is desirable to know the degree of distortion in an actual or test signal. In systems of this type, it is customary to indicate distortion by adding the greatest error of time by which any signal transition, that is a change from mark to space or space to mark, precedes the correct transition point, to the greatest error by which any signal transition follows the correct transition point and expressing the result as a percentage of the fixed unit.

One method of measuring signal distortion and which affords direct readings on meters is one in which the final indicating circuit is dependent on measuring the charge produced on a condenser by the signal, this charge being proportional to distortion or peak distortion. This method has certain disadvantage; it is dependent upon the leakage resistance of the condenser and the shunt resistance of the measuring circuit and there is a definite limit of time after the start of the measurement, after which observations of sufficient accuracy cannot be made, so that the possible length of any test signal is limited.

The invention has for its object to provide an improved apparatus for indicating percentage distortion of signals of this kind and especially one in which a readily readable indication may be obtained, for example by means of a meter, and without the disadvantages of the earlier methods referred to.

In a system according to the present invention, a series of timing impulses are produced, one of which may be made coincident with a signal transition. If subsequently a signal transition occurs and does not coincide with a timing pulse, that is, if the signal contains a distorted element, means are provided to produce measuring pulses spaced by a duration equal to the error. If subsequently, there is a greater error in the same sence, or an error in the opposite sense, the spacing of the measuring pulses is accordingly increased so that it is equal to the sum of the maximum errors. The measuring pulses are caused to operate a trigger circuit so as to produce square waves of duration proportional to the spacing of the measuring pulses, and means are provided responsive to the duration of the square waves to provide the desired indication.

In a preferred arrangement according to the invention, use is made of a standard timing device such as a stabilised oscillator whose period is a small aliquot part of the fixed time unit of the signal, i. e., the oscillator frequency is a high multiple of the telegraph frequency. The oscillations of the oscillator are applied to pulse-counting devices which each produce a single output pulse after receiving the number of pulses which occur in the fixed time unit.

Two such pulse-counting devices are employed receiving in parallel input pulses from the oscillator and the counting devices will, therefore, each emit a train of pulses spaced by the fixed time unit of the signal. The counting devices are, however, arranged to periodically start counting in response to pulses received from the signal transitions, but one of the counting devices is arranged to be capable of being restarted only after receiving $$\frac{n}{2}$$

pulses and the other before receiving $$\frac{n}{2}$$

pulses, where $n$ is the number of oscillations of the stabilised oscillator which occur in the fixed time unit.

Means are provided whereby both counters are started by the first signal transition; this transition is used for a time reference point. After this instant, one counter is only restarted by a signal transition which occurs in advance of its correct position in time and subsequently by a signal transition which is more in advance of the correct position than any previous transition. Similarly, the other counter is only restarted by a signal transition which occurs later than the correct position and subsequently by a signal transition more delayed than any previous transition.

If either counter is not restarted by a signal transition, it will count up to $n$ pulses and then emit an output pulse. By this means, the pairs of output pulses from the counters, although initially occurring at the same instant will, if the signal is distorted, have a relative displacement in time equal to the peak distortion.

The separate pulses of each pair are arranged to be of opposite polarity and are used to operate a trigger circuit of the type which gives an output dependent upon the polarity of the previous input pulse such as is described in our copending application Serial No. 739,876, filed April 7, 1947. The resultant rectangular waveform has a direct-current component proportional to distortion which may be indicated on a meter by conventional circuits. Switching means are provided so that observations may be made of transitions from mark to space or from space to mark as desired.

A more complete understanding of the invention may be had by reference to the following description and the accompanying drawings in which Figures 1a to 1g show waveforms at certain points of the circuit.

Figure 1a shows a typical undistorted telegraph signal with all transitions occurring at time intervals which are a multiple of the telegraph unit, while Figure 1b shows the same signal as it might appear after transmission over a line or through an apparatus giving rise to distortion. In Figure 1b the various transitions have been delayed for unequal periods of time, so that the mark and space elements no longer have the correct relationship.

In order to measure the time error of the occurrence of each transition, a series of time reference points are set up with a recurrence frequency equal to the telegraph frequency. If the first of the reference points occurs at the instant when the first transition of the signal under test occurs, then each succeeding transition should coincide with a reference point.

Transitions which do not coincide with a reference point thus indicate distortion and means are, therefore, provided to measure the maximum time difference ($t_a$) between the arrival of a transition and its associated reference point when the transition occurs before the reference point, and other means are provided to measure the time difference ($t_b$) between the arrival of a transition and its associated reference point when the transition occurs after the reference point. The sum ($t_a+t_b$) expressed as a percentage of the telegraph time limit is then the maximum distortion that has occurred up to the time of the measurement.

It should be pointed out that the degree of distortion which occurs in practice, and the degree of distortion which would normally be produced by a test equipment simulating practical conditions, is not so great as to cause confustion between a transition and its associated reference point, and in general the associated reference point will be that nearest in time to the transition.

In order to measure the sum of the time intervals between the arrival of a transition and the associated reference pulse, two pulse counting circuits A and B are arranged in parallel so as to count cycles from an oscillator operating at a frequency of $n$ times the telegraph frequency. A convenient value for $n$ is 100; within limits, the higher the value of $n$ the greater is the accuracy of the measurement. These counters are arranged to deliver an output pulse after receiving $n$ pulses and the output pulse rate will, therefore, equal the telegraph frequency.

Each counter has a control circuit which can restart the counting process from zero. Means are provided so that counter A can only be restarted before it has counted $$\frac{n}{2}$$

pulses and counter B can only be restarted after it has counted $$\frac{n}{2}$$

pulses. The signal which restarts the counters is derived from the incoming telegraph signal by circuits which produce a sharp voltage pulse at each transition. The output from counter A is a series of pulses of polarity opposite to the pulses from counter B.

The pulses are mixed and applied to a trigger circuit of the type described in the previously mentioned copending application which delivers a steady output of which the amplitude depends upon the polarity of the last pulse received.

The output of this mixer circuit, which is applied to the input of the trigger circuit, will consist of pairs of pulses of alternate polarity and spaced by the maximum error and the output of the trigger circuit, therefore, consists of a series of rectangular pulses of constant amplitude and with width equal to the time interval between the most delayed and the least delayed transitions. The width of these pulses is indicated by connecting the output of the trigger circuit to a meter indicating the average direct current component. This meter can, therefore, be calibrated directly in percentage distortion.

The waveforms of the voltages at various parts of the apparatus are indicated in Figures 1a to 1g; of these figures, Figure 1a shows the undistorted signal; Figure 1b shows the same signal as it might appear after being distorted; Figure 1c shows the output from counter A which can only be restarted before it has counted $$\frac{n}{2}$$

pulses, and Figure 1d shows the output from counter B which can be restarted only after it has counted $$\frac{n}{2}$$

pulses; Figure 1e shows the waveform obtained from the output of the mixer to which the waveforms of Figures 1c and 1d are applied and Figure 1f shows the output of the final trigger circuit to which voltages as in Figure 1e are applied; Figure 1g shows the voltage indicated by the meter.

The undistorted signal as shown in Figure 1a has a series of transition points $a_1$, $a_2$, $a_3$, $a_4$, and the time intervals $a_1a_2$, $a_2a_3$, $a_3a_4$ will all be an integral number of signal time units. These transition points after distortion by a transmission line or apparatus occur as transition points $b_1$, $b_2$, $b_3$, $b_4$. The intervals $b_1b_2$, $b_2b_3$, $b_3b_4$ may no longer be an integral number of time units.

The transition which occurs at $b_1$ is caused to produce a sharp pulse which is used to restart both the counters A and B, as at $c_1$, and $d_1$ respectively in Figures 1c and 1d. From this instant, counter A will be restarted every $n$ oscillations of the oscillator and it can be restarted by the pulse derived from a transition, if it arrives before the counter has counted $$\frac{n}{2}$$

oscillations of the oscillator. Similarly, counter B is started every $n$ oscillations and can be restarted by a pulse derived from a transition if it occurs after the counter has counted $$\frac{n}{2}$$

oscillations.

In the example shown, the second transition $b_2$ arrives exactly one time unit after $b_1$, so that the resultant output from counter A and counter B occurs after $n$ oscillations of the master oscillator and coincides with the pulses $c_2$, $d_2$, which occur when the counters restart. Time intervals $c_2c_3$, $c_3c_4$, $d_2d_3$, $d_3d_4$, between succeeding counter pulses are each equal to one telegraph unit as no transitions have arrived to restart either counter during these periods. The transition $a_3$, however, is delayed so that the received transition arrives at an instant $b_3$, which occurs before counters A and B have counted $$\frac{n}{2}$$

oscillations. Transition $b_3$, therefore, has no restarting effect on counter B but restarts counter A at point $c_5$. It can be seen that the time difference between $d_5$ and $c_6$ is now equal to the distortion of transition $b_3$ with respect to the first transition at $b_1$.

It will be seen that pulses $c_2$ and $d_2$, $c_3$ and $d_3$, and $c_4$ and $d_4$ occur at the same instants of time, and as they are of opposite polarity the effect of combining them in the mixer circuit is to produce zero output in the mixer output circuit, as indicated in Figure 1e. On the other hand, pulses $c_6$ and $d_5$ are not coincident, and there is produced in the mixing circuit output a pair of pulses $e_1$, $e_2$, which cause the trigger circuit to produce an output pulse $f_1$.

Intervals $c_6$, $c_7$ and $d_5$, $d_6$ are each equal to unit time, so that pulses $c_7$ and $d_6$ give rise to a pair of pulses $e_3$, $e_4$ which are spaced by the same amount as $e_1$ and $e_2$ and pulse $f_2$ caused by pulses $e_1$, $e_2$ is, therefore, similar to pulse $f_1$ in duration. Transition $a_4$, however, is delayed to point $b_4$ and this pulse will occur when counter B has counted more than $$\frac{n}{2}$$

oscillations and counter B is, therefore, restarted. Transition $b_4$ also occurs when counter A has counted more than $$\frac{n}{2}$$

oscillations and, therefore, counter A is not restarted. The output of the mixer circuit will consist of a single pulse $e_5$ which as it corresponds in polarity to the last pulse $e_4$, has no effect upon the trigger circuit.

The maximum distortion is now represented by the time difference between $d_7$ and $c_8$ and, if no further telegraph signals are received, pulses from counter B will occur at instants $d_8$, $d_9$, $d_{10}$ and pulses from counter A at instants $c_9$, $c_{10}$, $c_{11}$, the time intervals $d_8$, $c_9$; $d_9$, $c_{10}$; $d_{10}$, $c_{11}$, being constant, and giving rise to a series of pairs of pulses $e_6$, $e_7$; $e_8$, $e_9$; $e_{10}$, $e_{11}$, which are equally spaced by an amount equal to the maximum distortion, and which in turn produce output pulses $f_3$, $f_4$, $f_5$ from the trigger circuit. The output of the trigger circuit is applied to a direct-current meter in such a manner that the direct-current component of the wave-form of Figure 1f is indicated as in Figure 1g. The reading of this meter is proportional to maximum total distortion and the meter is calibrated to read percentage distortion directly.

Figure 2:
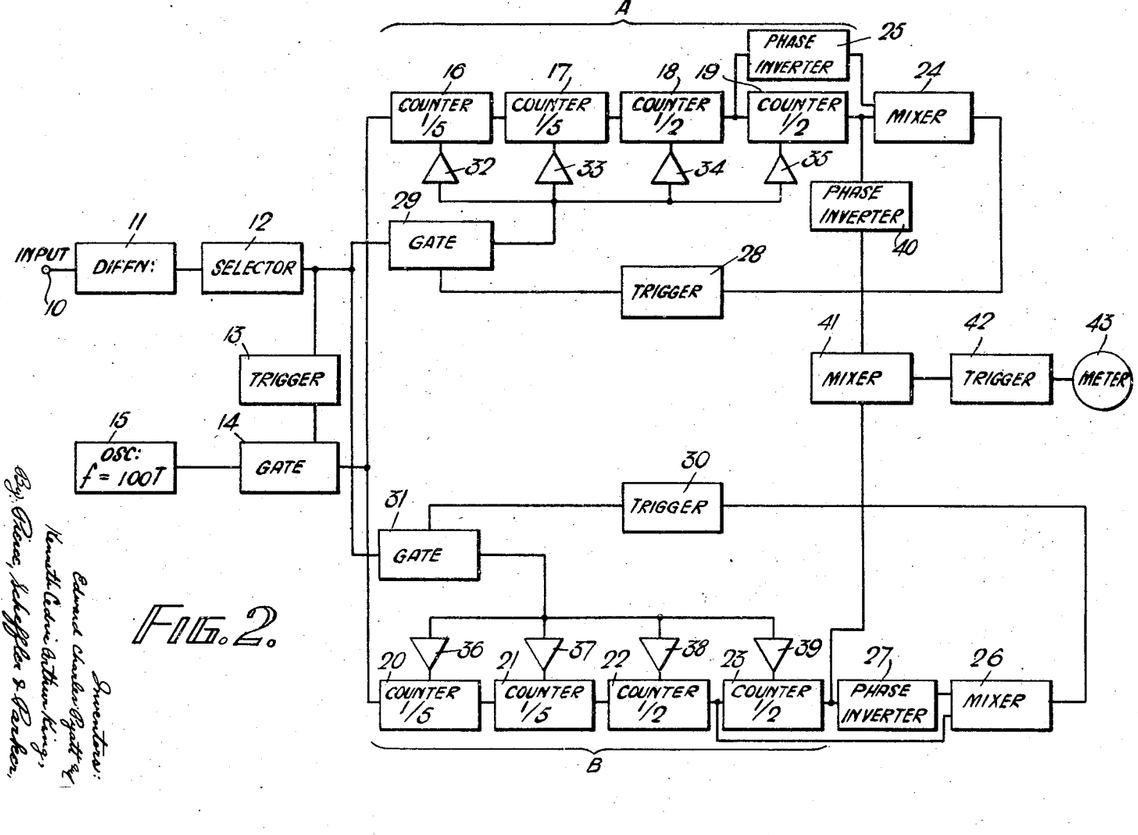
Figure 2 is a block schematic diagram of a complete arrangement, a part of which is shown in more detail in Figures 3a, 3b and 3c.

A block schematic arrangement of one embodiment of the invention is shown in Figure 2 of the accompanying drawings. In this arrangement, the telegraph signals of which the distortion, if any, is to be indicated or measured, are applied to the input terminals 10, and are then fed to a differentiation network 11 which produces at each signal transition a sharp pulse the polarity of which depends upon whether the transition is from mark to space or space to mark. These pulses are then modified by means of a selector circuit 12 which functions to invert some of the pulses, so that all transitions produce a pulse of similar polarity.

The pulses thus produced are passed to a control amplifier, which comprises a trigger circuit 13 and an associated gate circuit 14. The trigger circuit is a valve device having two conditions of stability, giving rise to two possible output currents, and which responds to an input voltage to change from one to the other of the two conditions. The gate circuit is a transmission device, controlled by the output current of the trigger circuit, so that together the trigger circuit and gate form the equivalent of an electronic switch.

The gate circuit is opened by the pulses from the selector circuit 12, and thereby allows oscillations to pass from a stable oscillation generator 15. This oscillator in this particular arrangement is chosen to have a frequency of 100T, when T is the telegraph frequency, so that each telegraph period corresponds to 100 oscillations. The oscillations are accordingly fed to two counting channels A and B in parallel; counter A comprises counting stages 16, 17, 18 and 19, which are respectively to scales of 5, 5, 2 and 2 and counter B similarly comprises stages 20, 21, 22 and 23 also to scales of 5, 5, 2 and 2.

The oscillations from the oscillator are thus applied to the counting channels when a signal is applied to the system and after every 50 oscillations counters 18 and 22 in the absence of any other signals applied thereto, emit a pulse, and counters 19 and 23 similarly emit a pulse after every 100 oscillations. The pulses from counter 19 are applied to a mixer unit 24, and pulses from counter 18 are applied to this mixer, but through a phase inverter 25; the output of mixer 24 accordingly consists of pulses at half telegraph periods and of alternate polarity. Counting channel B is similarly arranged with a mixer 26 and phase inverter 27, but in this channel the phase inverter is fed from the output of counter 23 so that the output pulses of mixers 24 and 26 are of opposite polarity.

The pulses produced by mixer unit 24 are applied to a trigger circuit 28 which with gate circuit 29 forms a further switch device which will be alternately open and closed during successive half telegraph period intervals; the arrangement is such that the switch is opened during the first half of each telegraph period interval following the start of the signal applied to terminals 10, and is closed during the second half. Mixer unit 26 feeds a similar trigger circuit 30 and gate circuit 31; the switch so formed is arranged to be closed during the first half of each telegraph period interval and open during the latter half.

Gate circuit 29 is arranged to control the applying of the pulse output from selector 12 to a series of buffer amplifiers 32, 33, 34, 35, feeding respectively the counters 16, 17, 18 and 19. Similarly, gate circuit 31 controls the feeding of the output from selector 12 to a series of amplifiers 36, 37, 38, 39 to the counters 20, 21, 22, 23 respectively.

The output of the counter 19 which, once the system has started operation in response to an applied signal and in the absence of a distorted signal, will consist of a series of pulses at telegraph periods, is applied to a phase inverter 40 which in turn feeds a mixer unit 41. To this mixer unit are fed also pulses from counter 23 which in the same circumstances consist of pulses similarly timed but which by virtue of the phase inverter 40 are of opposite polarity. The mixer unit 41 feeds a trigger circuit 42, of which the mean output current is indicated by a meter 43; so long as the input pulses to the mixer 41 are simultaneous there is no effect upon the trigger circuit and the meter 43 indicates a steady or zero current.

Referring now to Figure 1, and assuming that the signal such as that of the waveform is applied to the system, the operation of the circuit will start at the transition $b_1$, and counters A and B will start counting. At transition $b_2$, the selector circuit 12 produces an output pulse, but this, coinciding with pulses $c_2$ and $d_2$ emitted by the counters, has no effect upon the output of the counters.

A further transition occurs at $b_3$ and occurs in the first half telegraph period interval following the output pulse of the counter A which occurs at $c_4$. At this instant, gate circuit 29 is opened and gate circuit 31 closed; there is accordingly no effect, due to the transition $b_3$, upon channel B, but the pulse is fed to all the counters 16, 17, 18 and 19 which are, thereupon, released and start to count again as from the instant $c_5$. The pulses subsequently applied to the mixer unit will, therefore, no longer coincide, but will occur at spaced intervals such as $d_5$, $c_6$, giving rise to output pulses $e_1$, $e_2$. These output pulses will operate the trigger circuit to produce an output current $f_1$ of which the duration is a measure of the distortion.

If a transition point, such as $d_7$, precedes the relevant timing pulse, the channel B will be operated, while channel A is unaffected, and in similar fashion the output current of the trigger circuit will be increased, as at $f_3$, in the manner previously described.

Figure 3A:
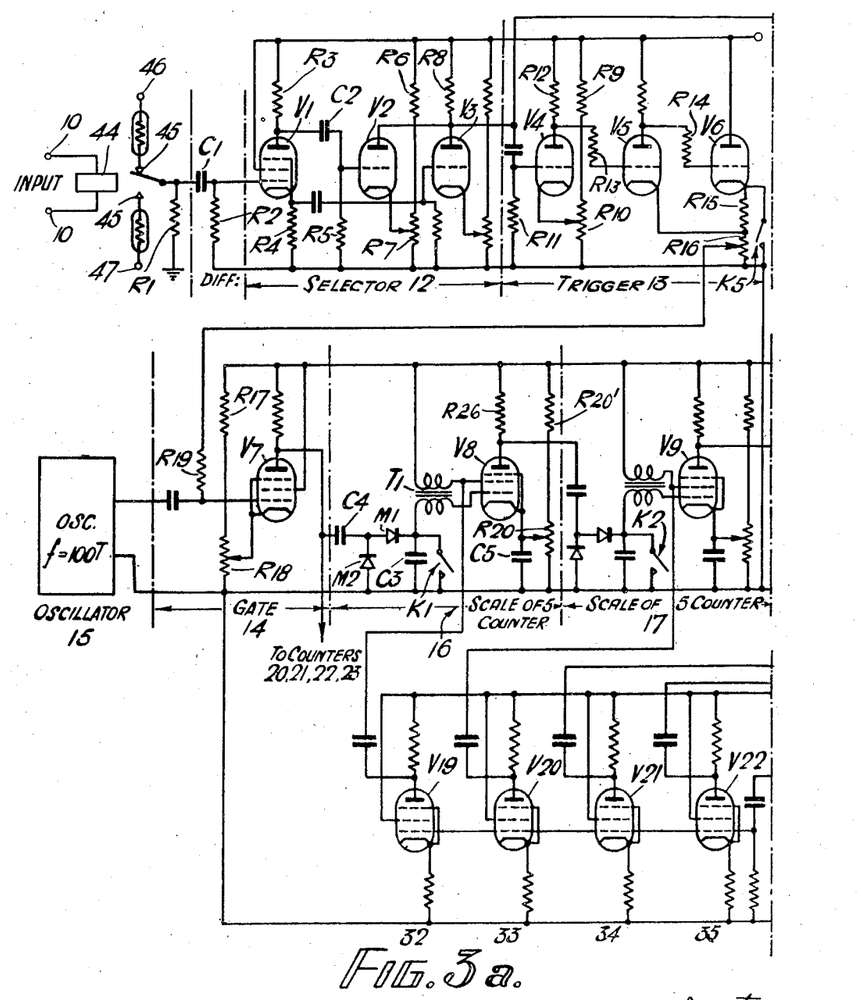
Figure 3B:
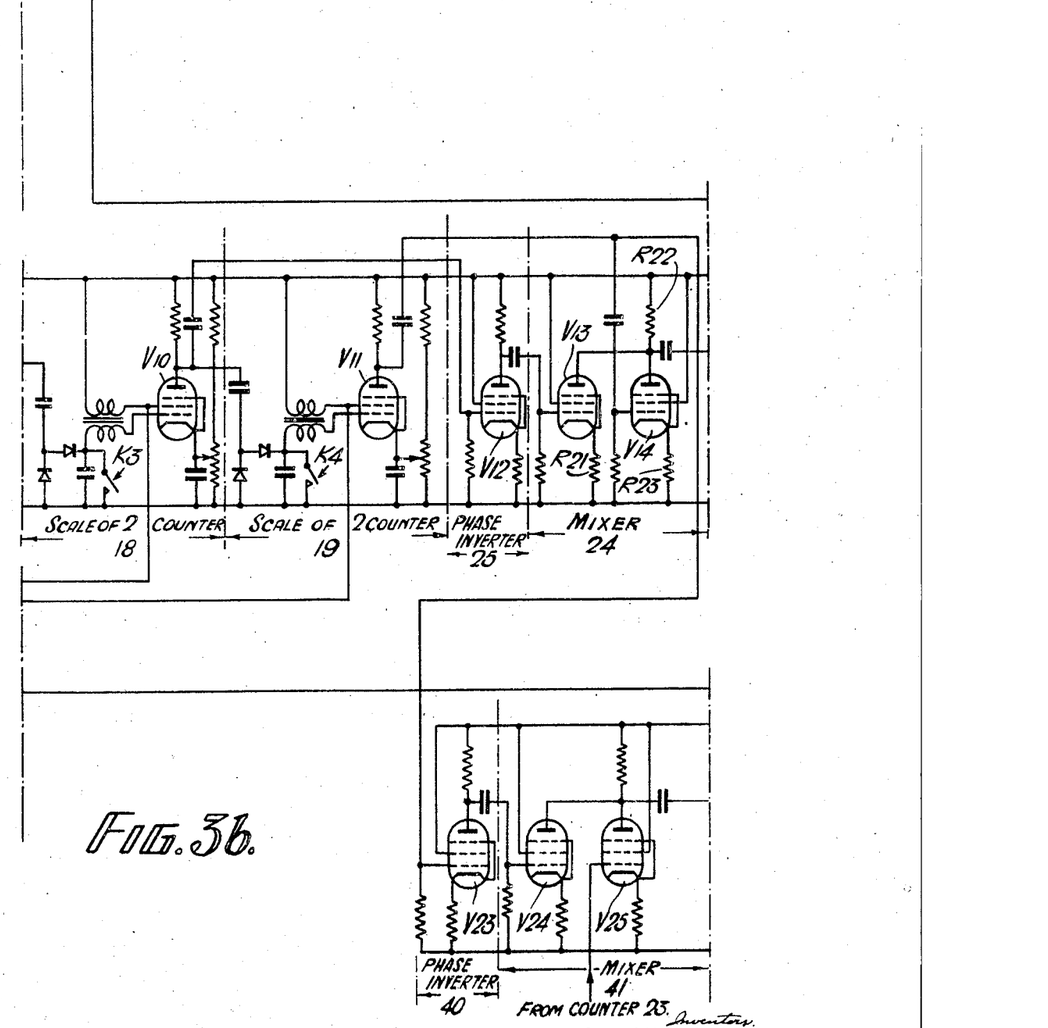
Figure 3C:
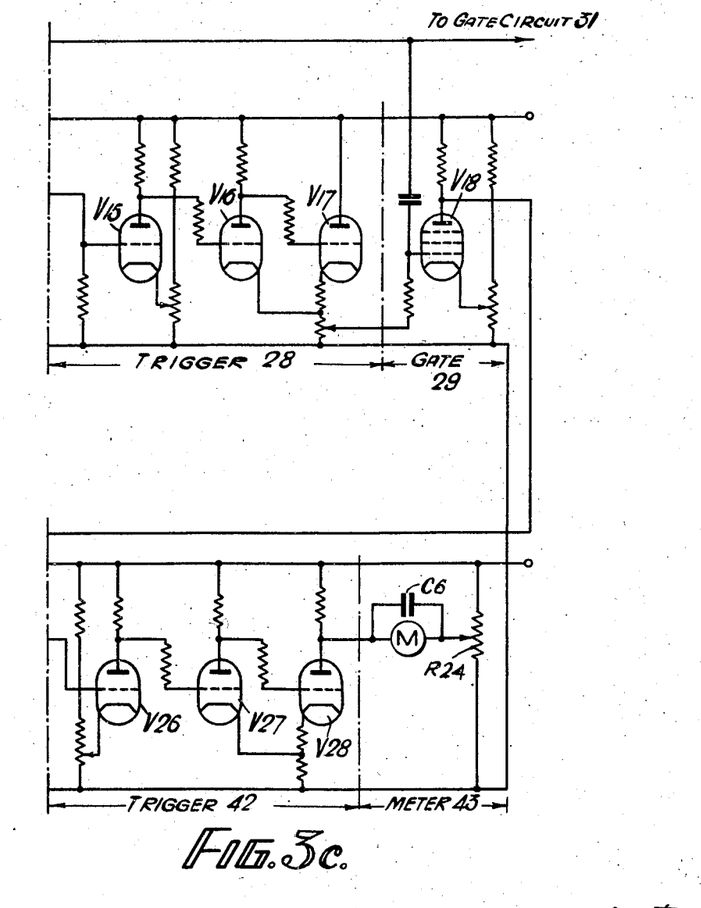

Figures 3a, 3b and 3c are circuit diagrams which are intended to be placed side by side to form one composite drawing, which is a circuit diagram of the major portion of the system shown in Figure 2, but omitting channel B. Channel B closely resembles channel A, but for certain minor alterations apparent from Figure 2 and referred to hereinafter, and it is considered that the arrangement of channel B to complete the diagram of Figure 3 will be readily apparent. In Figure 3, the parts corresponding to the blocks of Figure 2 bear like reference numerals, the chain dotted lines in Figure 3 dividing that figure into its component blocks.

In Figure 3, the input signals are applied to terminals 10 and are caused to operate a relay 44 of which the contacts 45 apply telegraph battery voltages 46, 47 across resistance R1. The voltage across resistance R1, which may be of the form shown in Figure 1a or 1b, is applied to the differentiator circuit 11 consisting of series condenser C1 and shunt resistance R2. The peaked voltages thus produced are applied to a valve V1 of the selector circuit 12 of which the load impedance is formed by two resistances R3, R4 included in the anode and cathode circuits respectively, so that the valve operates as a phase splitter, the voltages appearing across these two resistances being of opposite phase.

The anode of valve V1 is coupled through condenser C2 to the grid of valve V2 having a grid resistance R5 and of which the cathode is returned to a point on a potential divider R6, R7 such that the valve is biased to or slightly beyond the point of anode current cut-off; in this way, negative-going pulses are suppressed in the grid circuit of the valve, the output appearing on the anode load R8 being, therefore, only negative-going pulses.

In similar manner, the cathode of valve V1 is coupled to a valve V3 also biased to cut-off, and having the same anode load R8 as valve V2. Negative-going pulses in the grid circuit of valve V3 are similarly suppressed and the valve produces negative-going pulses across the anode load R8. As valves V2 and V3 are fed in opposite phase, however, the valves produce a negative-going pulse irrespective of the polarity of the pulse applied to the valve V1.

The pulses thus produced are applied to the input of trigger circuit 13 comprising three valves V4, V5, V6. The operation of this trigger circuit is explained in detail in our earlier application, to which attention is directed for a more complete description of its operation. Briefly stated, the valve V4 is biased by connecting the cathode of the valve to a point on a potential divider R9, R10, the valve having a grid resistance R11. The voltage appearing across the anode load R12 is directly coupled over resistance R13 to the grid of the valve V5 and the voltage appearing across the anode load of this valve is applied over resistance R14 to the grid of valve V6. Valve V6 includes in its cathode circuit two resistances R15, R16, of which R15 is also included in the cathode circuit of valve V5.

It can be shown that the valves V5 and V6 can adopt either of two stable conditions; one in which valve V5 passes a large anode current and valve V6 a low anode current and the other in which these conditions are reversed. The valves can be changed from one to the other of the two conditions by the application of an appropriate voltage to valve V4; further applications of a voltage of the same polarity will not change the condition of equilibrium.

The voltage appearing across resistance R16, which will be high or low depending upon the condition of the trigger circuit, is used as a control voltage for a valve V7 forming the gate circuit 14. This valve is biased by returning its cathode to a point on a potential divider R17, R18 and including in the grid circuit resistance R19 and part of resistance R16. This valve is, therefore, arranged to be biased within the normal range of bias in one condition of the trigger circuit, and to be biased beyond cut-off in the other condition of the circuit.

The gate circuit 14 thus formed is used to control the supply of oscillations from oscillator 15 to the two counting channels A and B, of which only the former is shown in Figure 3. Channel A comprises the four stages 16, 17, 18 and 19, which are similar in general arrangement and in operation, and are of a type known per se. The first stage 16 comprises a pentode valve V8, the screen grid and control grid circuits of which are very tightly coupled by a transformer T1 so as to form an oscillator circuit in which the amplitude of oscillation would tend to be very large. The control grid circuit of the valve, which includes the one winding of the transformer T1, is completed to earth through two rectifiers M1, M2 for example of the dry contact type, which are connected in the "reverse" direction so that the resistance of the grid circuit to earth (in that direction) is represented by the reverse resistance of the rectifiers in series and is, therefore, extremely high. If thermionic diodes are employed, the resistance can be considered infinite.

The two rectifiers are shunted by a condenser C3 and the input through condenser C4 is applied to the junction of the rectifiers; the cathode of the valve V8 is given a positive bias with respect to earth by connecting it to a point on a potential divider formed by resistances R20, R29'. A large by-pass condenser C5 is included for the cathode circuit portion of the potential divider, and a suitable load resistance R26 is included in the anode circuit of the valve.

The anode potential of the valve V7 varies in accordance with the oscillations from the oscillator 15 and when the anode is at a low potential the condenser C4 is able to discharge through the rectifier M2 and the anode-cathode path of the valve. As the valve V7 is normally passing current, condenser C4 is normally discharged.

When oscillations are applied to valve V7, there is a resulting decrease in the anode current of the valve and the potential of the anode rises. A charging current accordingly flows into condensers C3 and C4, and the condenser C3 acquires a charge; the final potential between the plates of the condenser will depend upon the relative values of the two condensers and the maximum potential reached by the anode of the valve V7. It is necessary for stable operation that the condenser C3 should attain a sensibly steady value while the anode remains near the peak positive potential.

When the oscillation again causes the anode current to increase, the condenser C4 will again discharge through the valve and the rectifier M2, but the condenser C3 will be unable to discharge either through the rectifiers M1, M2, since these present a high resistance in the discharge direction or through the grid-cathode circuit of valve V8, since the resistance R20 is set to produce a large positive bias on the cathode of the valve. After one oscillation, therefore, the circuit is as it was in the initial condition, save that the condenser C3 has acquired a certain potential. The valve remains quiescent by reason of the prohibitive bias between grid and cathode.

When the second oscillation is received, the cycle of operation is repeated, but in this case the condenser C3 acquires a further increase of potential, though not quite as great as the first since the voltage available to charge the two condensers is diminished by the potential across condenser C3.

In similar fashion, each succeeding cycle of oscillation increases the potential across the condenser until a point is reached where the grid-cathode potential of the valve, which is equal to the difference in potential of condensers C3 and C5 is such as to permit anode current to flow in the valve.

As soon as this condition is reached, the valve oscillates and there is an immediate increase of anode current, accompanied by a large positive excursion of the grid. Heavy grid current is drawn and the condenser C3 acquires a large negative charge so that after the single pulse of anode current, the initial conditions of the circuit are restored. It will be seen, therefore, that after a number of applied oscillations, a single pulse is emitted from the valve, and the number of oscillations which are required to produce the single pulse can be controlled by adjustment of the bias on the cathode of the valve by means of the resistance R20.

The succeeding stages 17, 18 and 19 comprise valve V9, V10 and V11 which function in the same manner as the stage 16, except that stages 18 and 19 are to a scale of two, while stages 16 and 17 are adjusted to operate to scale of five. Consequently, the output of valve V10 of counter 18 is a pulse at each half telegraph period, and of valve V11 of counter 19 a pulse at each complete telegraph period.

The output of valve V10 is fed to the inverter stage 25, which comprises a valve V12 arranged to operate as a conventional voltage amplifier. The output of this valve is fed to the first of two parallel valves V13, V14, which constitute the mixer stage 24. Valve V13 is biased by cathode bias resistor R21 and is provided with an anode load R22 which is common to the two valves. Valve V14 is biased also by a cathode bias resistor R23, but receives its input from the valve V11 of the final counter 19.

The voltage appearing across the anode load R22 will, therefore, consist of a series of pulses at half telegraph period intervals, due to valve V13, and a series of pulses at complete telegraph period intervals, but of opposite polarity, due to valve V14. By making the latter pulses larger in amplitude than the former, the resultant output can be made to be a series of alternately positive and negative pulses at half telegraph period intervals.

This signal is applied to the trigger circuit 28, consisting of valves V15, V16 and V17, which are arranged in the same way as valves V4, V5 and V6 of the trigger circuit 13, and operate in the same manner. In trigger circuit 28, however, the anode current of the output valve V17 will have a waveform consisting of square waves of half telegraph period duration. This output current is applied to the valve V18 of the gate circuit 29; this valve is similar in operation to valve V7 of gate circuit 14, except that gate circuit 29 will be alternately open and closed during the first half and latter half respectively of each telegraph period interval following the first transition of the applied signal.

Gate circuit 29 controls the application of the pulse output of the selector circuit 12 to the input of the buffer amplifiers 32, 33, 34, 35, which comprise respectively valves V19, V20, V21 and V22. These valves, like valve V12, are arranged as conventional voltage amplifiers, and the output voltages therefrom are fed respectively to an input circuit of the counter stage valves V8, V9, V10 and V11. As shown, the amplifier output is applied to the screening grids of the valves.

As described above, the gate circuit 29 is open during the first half telegraph period following the first transition of the applied signal, and during this and the alternate half periods, the gate circuit will permit a pulse generated by the pulse selector 12 to be applied to the counting valves V8, V9, V10, V11. While the applied signal continues to be undistorted successive transitions will coincide with a pulse by the counting circuits and the transition pulse applied to the counters will have no effect upon the counters since they will, in any case, emit a pulse at that moment. When the transition occurs at $b_3$, however, the counters will have all emitted a pulse at the instant $c_4$, which precedes it slightly and will have started to recount from that instant. Since the interval $c_4$, $c_5$ is less than one half of a telegraph period, the gate circuit 29 is open and so there is fed to all the counters a pulse which discharges the charge, if any, upon the condensers C3. The counters are accordingly restarted from the instant $c_5$.

From this instant, the counter V11 will emit pulses at telegraph period intervals as before, and these pulses are fed through a phase inverter stage 40, comprising a valve V23 arranged as a conventional voltage amplifier, to a mixer stage 41 comprising the valves V24 and V25. This mixer stage is similar to the mixer stage 24 and the pulses from counter valve V11 will accordingly appear in the common output of the valves V24 and V25.

At this point, it is convenient to refer to the arrangement of the B channel, not shown in Figure 3. As appears from Figure 2, the general arrangement of this channel is similar to the A channel except that (a) the channel should be responsive to pulses from selector circuit 12, which occur only in the second half of each telegraph period and (b) the output pulses from the mixer stage 41 corresponding to pulses from the final counter stage 23 should be of polarity opposite to those produced in the mixer stage by the counter stage 19.

Channel B will, therefore, include stages substantially identical with those of channel A except that the phase inverter valve V12 and mixer stage valves V13, V14 will be fed differently so that resulting output from the mixer valves is in opposite polarity to that from the valves of the A channel. In this way, gate circuit 31 is made to close during the first half of each telegraph period and open during the latter half.

In channel B no phase inverter such as 40 is incorporated, so that the output pulses from the counters 19 and 23 will be applied to the mixer circuit 41 with opposite polarity.

Considering now the operation of the B channel in response to the signal transition which occurs at the point $c_5$, it will be seen that, since the transition occurs at a point which is during the first half of a telegraph period, the gate circuit 31 will be closed, and the counters 20, 21, 22 and 23 will, therefore, be unaffected, and will produce an output pulse at instant $d_6$. This pulse is applied to the input of the valve V25 of the mixer stage, and will appear in the common output circuit of the valves V24 and V25. As previously described, the outputs of the channels A and B are now displaced in time in the manner indicated in Figures 1c and 1d and the output of the mixer stage will, therefore, be as shown in Figure 1e.

This last signal is applied to a trigger circuit 42, comprising valves V26, V27 and V28 which are arranged in the same way as the valve of the other trigger circuits 13 and 28. The output of the valve V28 will, therefore, be of the form indicated in Figure 1f, and by means of a meter stage 43 comprising a meter 44 shunted by a large condenser C6, the average value of the anode current of the valve V28 can be indicated. The standing or lesser current of the valve can be backed-off by connecting the meter 44 between the anode of the valve V28 and a point on a potential divider R24.

The meter stage 43 will thus give an indication of the average value of the pulses developed by the trigger circuit 42; these pulses are of constant amplitude and with sharp leading and trailing edges, so that the average value is proportional to the duration of the pulses and so to the distortion of the telegraph signal by which they are produced.

It has already been pointed out that channel A is in operation only during the first half of each telegraph period following the initial signal transition; it will, therefore, respond only to distortion where a transition is delayed, and occurs after the instant at which the corresponding transition of an undistorted signal would occur. Channel B on the other hand operates only during the latter half of each telegraph period and will, therefore, respond only to that distortion in which a transition precedes the correct transition point, and the effect of the mixer circuit 41 is to produce pulses spaced by an amount equal to the sum of the two distortions and is thus a measure of total distortion.

Once distortion has occurred and the counters of channel A have been restarted, the counters will always restart counting at telegraph period intervals until such time as a transition occurs which is slightly more than a complete number of telegraph units after that transition which last restarted the counters, i. e., until a signal occurs which is more distorted (in the same sense) than any previous signal. Channel B operates in the same way for all signals which are distorted in the other sense, and of which the transitions precede the correct transition point.

Once distortion has occurred, the meter 43 will accordingly continue to indicate distortion until a greater distortion occurs. To cancel the indication means are provided to restart the counters of channels A and B simultaneously. This is effected by a key switch having ten contacts of which four, K1, K2, K3, K4, are included in shunt to the condensers C3 of the counting valves V8, V9, V10, V11; so long as these contacts are closed, the valves will be unable to operate. Four further contacts are similarly arranged in the B channel counting stages 20, 21, 22, 23. A contact K5 is also arranged to shunt the resistances R15 and R16 in the cathode circuits of the valves V5 and V6 of the trigger. When this contact is closed, the bias on valve V7 of the gate circuit 14 is prohibitive and no oscillations are fed from the oscillator 15, and both channels A and B are completely quiescent, a similar contact being included in the corresponding trigger circuit 30. When the contacts of the key are opened, the circuit is rendered ready for operation, but the gate circuit 14 remains closed until the first transition point of an applied signal occurs.

The operation of the circuit of Figure 3 will be as described with reference to Figure 2, but to recapitulate, the operation of the circuit in the presence of a signal as shown in Figure 1b is as follows:

At transition point $b_1$ relay 44 operates and a pulse is applied to differentiator C1, R2, which is differentiated and applied to valve V1; valves V1, V2 and V3 then operate as described above to produce a negative going pulse at the anode of V3. This is applied to trigger valves V4, V5 and V6, and the anode current of V6 changes from a high to a low value, thus opening "gate"

valve V7 and permitting oscillations from oscillator 15 to be fed to the scale of five counters V8 and V9 and scale of two counters V10 and V11. Counters 20, 21, 22 and 23 are similarly started.

After 50 oscillations a pulse appears at the anode of valve V10, and corresponding pulse in counter 22. The pulse from valve V10 is applied to phase inverter V12 and thence to mixer valve V13; the pulse from counter 22 is applied to mixer 26. The pulse at the anode of mixer valve V13 operates trigger valves V15, V16 and V17, the anode current of the last valve being changed from a low to a high value, and thereby closes "gate" valve V18. In similar fashion gate 31 is opened at this instant of time.

After one unit of time, transition $b_2$ occurs, coincident with the generation of further pulses by counters 18 (valve V10) and 22, and by counters 19 (valve V11) and 23. Pulses are produced in the common anode load of valves V13 and V14, and a corresponding pulse in mixer 26. Trigger circuits 28 change over, and gate circuits 29 (valve V18) and 31 are respectively opened and closed. There is no output from mixer 41.

At a point one half unit of time later gate circuits 29 and 31 are again reversed by the pulses generated at the counters 18 and 22 and at point $c_3$ a further half unit later the gate circuits again change over. At this point also pulses appear at the anode of valve V11 of counter 19 and of the corresponding valve of the counter 23. These pulses being coincident there is again no output from mixer 41. During the next whole unit up to $c_4$ this cycle is repeated.

At point $b_3$ however a further pulse appears at the anode of valve V6; at this instant gate circuit 29 is open and gate circuit 31 is closed, so that counters 16 to 19 are all discharged, but counters 20 to 23 are unaffected as a result of this, at an instant one half unit after point $c_4$ gate 31 opens as before but gate 29 opens one half unit after $b_3$ (or $c_5$). One whole unit after $c_4$, counters 22 and 23 again emit pulses and that from counter 23 is applied to valve V25. A pulse is accordingly applied to trigger valve V26 causing valve V28 to increase its anode current from a low to a high value.

At point $c_6$, one whole interval after $b_3$, or $c_5$ a pulse appears at the anode of counter valves V10, V11 and V11 causes a pulse to be applied to mixer valve V24 through inverter valve 40, thereby changing valve V28 back to its low current conditions.

This sequence of operation continues until point $b_4$ is reached; at this moment gate circuit 29 will be closed, being in an odd half interval after transition $b_3$ but gate circuit 31 is open. Thereby counters 20 to 23 are discharged, and recommence counting. The output from counters 22, 23, which would have occurred shortly after, is suppressed, but at instant $c_8$, one whole interval after $c_7$ pulses are again produced by valves V10 and V11. A pulse is then produced by mixer 41, but this has no effect on valve V28, since the pulse is of the same polarity as that last applied.

At point $d_8$, one unit interval after $d_7$, a pulse is produced in mixer 41 to change the condition of valve V28, followed shortly after by a pulse $c_9$ due to valve V11. Valve V28 will thus pass anode current for a short time, which is the desired indication of error.

It will be understood that while a specific form of the invention has been described, this has been given by way of example only, and that other arrangements may be adopted to carry the invention into effect.

We claim:

1. A device for indicating or measuring the distortion of a telegraph or like signal consisting of elements each of which are, or should be, an integral multiple of a telegraph unit, comprising comparison means selectively responsive to said signal during a period immediately following a whole number of units after a reference point of said signal, a second comparison means selectively responsive to said signal during a period immediately preceding a whole number of units after a reference point of said signal, said comparison means each operating to produce a current or voltage which is a measure of the departure of said signal from the correct form, and indicating means responsive to said currents or voltages.

2. A device for indicating or measuring the distortion of a telegraph or like signal consisting of elements each of which are, or should be, an integral multiple of a telegraph unit, comprising a timing means rendered operative by the signal of which the distortion is to be indicated or measured and thereby to produce a series of timing voltages, two comparison means each responsive to said timing voltages and said signal, said comparison means being respectively operative only during a period immediately preceding and immediately following a timing voltage, said comparison means each including means responsive to said timing voltages and to a change in said signal to produce an output current which is a measure of the difference in time occurrence of said change and a timing voltage, and means for combining additively the outputs of the comparison means to indicate the distortion of said signal.

3. A device for indicating or measuring the distortion of a telegraph or like signal consisting of elements each of which are, or should be, an integral multiple of a telegraph unit, comprising timing means initiated by a change of said signal to produce thereafter a series of timing voltages at telegraph unit intervals, a second timing means also initiated by a change of said signal and producing thereafter timing voltages at telegraph unit intervals, said timing means being arranged to be restarted respectively by signal changes which occur in a period immediately preceding or immediately following a whole number of telegraph unit intervals after said initiation, and means responsive to timing voltages from both said timing means for indicating the total distortion of said signal.

4. A device according to claim 3 and comprising an oscillation generator of a frequency which is a high multiple of the telegraph frequency, and said timing means each including means for deriving from the oscillations of said generator a timing voltage at telegraph period intervals by counting down said oscillations.

5. A device according to claim 4, wherein the means for counting down said oscillations comprise a condenser the charge upon which is successively varied in accordance with successive oscillations, means for developing a timing voltage impulse and for restoring to an initial condition the charge on said condenser after a predetermined number of oscillations, and means responsive to a voltage derived from a signal change to restore said charge to its initial condition, whereby said counting means is caused to restart counting.

6. A device for indicating or measuring the distortion of a telegraph or like signal consisting of elements each of which is, or should be, an integral multiple of a telegraph unit, said device comprising means for producing from the signal of which the distortion is to be measured a succession of control pulses corresponding each to a transition or change of said signal, an oscillator whose frequency is a high multiple of the telegraph frequency, means operated by said pulses to permit oscillations from said oscillator to pass to two counting devices, each counting device including means to produce from said oscillations output pulses at telegraph period intervals, two gate means controlled respectively by said counting means and arranged to be opened and closed during respectively the first and the second half of the telegraph period intervals as measured by the associated counting means, said gate means being arranged to control the application of said control pulses to said counting means and hence the restarting thereof by said pulses.

7. A device according to claim 6, in combination with a trigger circuit upon which said output pulses from the two said counting devices are applied in opposite phase, said trigger circuit being of the type having two conditions of stability and being adapted to be changed from one to the other by voltages applied thereto, whereby said trigger circuit develops an output voltage waveform of constant amplitude and duration proportional to the distortion of the original signal.

8. A device according to claim 7, and comprising means for indicating the average value of said output pulses.

EDWARD CHARLES PYATT.
KENNETH CEDRIC ARTHUR KING.

REFERENCES CITED

The following references are of record in the file of this patent:

UNITED STATES PATENTS

| Number | Name | Date |
|---|---|---|
| 2,102,719 | Kinkead | Dec. 21, 1937 |
| 2,370,685 | Rea et al. | Mar. 6, 1945 |